(12) United States Patent
Ogasawara et al.

(10) Patent No.: US 8,617,445 B2
(45) Date of Patent: Dec. 31, 2013

(54) PROCESS FOR PRODUCING ORIENTED THERMOPLASTIC POLYESTER RESIN SHEET, AND LAMINATE-MOLDED BODY

(75) Inventors: Shigeru Ogasawara, Kyoto (JP); Hirotsugu Yoshida, Kyoto (JP); Hisashi Eguchi, Kyoto (JP); Ryuichi Matsuo, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 1469 days.

(21) Appl. No.: 11/886,235

(22) PCT Filed: Feb. 17, 2006

(86) PCT No.: PCT/JP2006/302882
§ 371 (c)(1),
(2), (4) Date: Sep. 13, 2007

(87) PCT Pub. No.: WO2006/098115
PCT Pub. Date: Sep. 21, 2006

(65) Prior Publication Data
US 2008/0182472 A1   Jul. 31, 2008

(30) Foreign Application Priority Data

Mar. 15, 2005  (JP) ................. 2005-073759
Mar. 30, 2005  (JP) ................. 2005-099691

(51) Int. Cl.
*B28B 11/08*   (2006.01)

(52) U.S. Cl.
USPC ........... 264/291; 264/479; 264/622; 264/164; 264/165; 264/292; 264/198; 264/208; 264/209.5; 264/210.7; 264/235.6; 264/235.8; 264/288.4; 264/288.8; 264/289.6; 264/290.7; 264/173.15; 264/175; 264/177.17; 264/209.3; 264/173.1

(58) Field of Classification Search
USPC ................. 264/291, 292, 294, 479, 622, 164, 264/209.5, 288.4, 165, 198, 208, 210.7, 264/235.6, 235.8, 288.8, 289.6, 290.7, 264/173.15, 175, 177.17, 209.3, 173.1
See application file for complete search history.

(56) References Cited

U.S. PATENT DOCUMENTS

| 4,451,422 A | 5/1984 | Yui et al. |
| 4,751,139 A * | 6/1988 | Hensel et al. ................. 428/323 |

(Continued)

FOREIGN PATENT DOCUMENTS

| CN | 87100038 A | 7/1988 |
| CN | 1140653 A | 1/1997 |

(Continued)

OTHER PUBLICATIONS

European Search Report issued Mar. 3, 2009 in the corresponding European patent application No. EP 06714023.

Primary Examiner — Jeff Wollschlager
Assistant Examiner — Stella Yi
(74) Attorney, Agent, or Firm — Wenderoth, Lind & Ponack, L.L.P.

(57) ABSTRACT

The present invention provides a process for producing an oriented thermoplastic polyester resin sheet which is excellent in tensile strength, tencile modulas and heat resistance, and a light laminate-molded body using the same, which has a low linear expansion coefficient and is excellent in impact resistance, durability, easiness of handling, productivity, and others. A process for producing an oriented thermoplastic polyester resin sheet, which includes: pultrusion-drawing a thermoplastic polyester resin sheet in an amorphous state at a temperature from the glass transition temperature of the thermoplastic polyester resin −20° C. to the glass transition temperature of the thermoplastic polyester resin +20° C.; and then drawing the resultant uniaxially at a temperature higher than the temperature for the pultrusion-drawing. A laminate-molded body, wherein a thermoplastic resin layer is laminated on each of the surfaces of the resultant oriented thermoplastic polyester resin sheet.

9 Claims, 3 Drawing Sheets

(56) References Cited

U.S. PATENT DOCUMENTS

| | | | |
|---|---|---|---|
| 5,049,347 A | 9/1991 | Magill et al. | |
| 5,387,388 A | 2/1995 | Van Erden et al. | |
| 5,405,699 A | 4/1995 | Van Erden et al. | |
| 5,525,287 A | 6/1996 | Van Erden et al. | |
| 5,534,215 A * | 7/1996 | Song et al. | 264/345 |
| 5,597,640 A | 1/1997 | Van Erden et al. | |
| 5,660,787 A | 8/1997 | Van Erden et al. | |
| 5,688,536 A | 11/1997 | Van Erden et al. | |
| 5,695,709 A | 12/1997 | Van Erden et al. | |
| 5,707,660 A | 1/1998 | Van Erden et al. | |
| 5,837,349 A | 11/1998 | Van Erden et al. | |
| 2003/0034587 A1 | 2/2003 | Suzuki et al. | |
| 2004/0154734 A1 | 8/2004 | Akada et al. | |
| 2005/0148720 A1 * | 7/2005 | Li et al. | 524/474 |
| 2006/0131779 A1 | 6/2006 | Kagawa | |

FOREIGN PATENT DOCUMENTS

| | | |
|---|---|---|
| CN | 1400092 A | 3/2003 |
| CN | 1509855 A | 7/2004 |
| EP | 0030648 A1 | 6/1981 |
| EP | 0355876 A1 | 2/1990 |
| EP | 0747200 A2 | 12/1996 |
| EP | 1275682 A1 | 1/2003 |
| JP | 60-015120 | 1/1985 |
| JP | 61-206624 | 9/1986 |
| JP | 61-268430 | 11/1986 |
| JP | 1-210327 | 8/1989 |
| JP | 8-183138 | 7/1996 |
| JP | 9-279783 | 10/1997 |
| JP | 10-291250 | 11/1998 |
| JP | 10-315366 | 12/1998 |
| JP | 11-019998 | 1/1999 |
| JP | 2905260 | 3/1999 |
| JP | 11-320674 | 11/1999 |
| JP | 2000-108190 | 4/2000 |
| JP | 2002-205332 | 7/2002 |
| JP | 2002-276099 | 9/2002 |
| JP | 2002-285685 | 10/2002 |
| JP | 2004-292656 | 10/2004 |
| JP | 2004-323596 | 11/2004 |
| JP | 3839037 | 8/2006 |
| JP | 2006-289936 | 10/2006 |
| JP | 2006-306012 | 11/2006 |

* cited by examiner

PROCESS FOR PRODUCING ORIENTED THERMOPLASTIC POLYESTER RESIN SHEET, AND LAMINATE-MOLDED BODY

This application is a U.S. national stage of International Application No. PCT/JP2006/302882 filed Feb. 17, 2006.

TECHNICAL FIELD

The present invention relates to a process for producing an oriented thermoplastic polyester resin sheet excellent in tensile strength, tensile modulus, and heat resistance, and a laminate-molded body which comprises the oriented thermoplastic polyester resin sheet as a core member and can be used suitably as an exterior building member.

BACKGROUND ART

Hitherto, some investigations have been made about a process for producing a crystalline polymeric sheet which has smooth surfaces and is transparent and high in strength and modulus of elasticity by pultrusion-molding. For example, suggested is a process of pulling out a crystalline polymeric original sheet made of polyethylene, polypropylene, polyacetal resin, nylon or the like into a draw ratio of at least 2.5 or more by means of a pair of rollers heated to a temperature that is not lower than the deformation-start temperature when the temperature of the sheet is raised at a temperature-raising rate of 1° C./minute and that is not over the rise-up temperature of the differential scanning calorimetry melting curve thereof while a load of 10 MPa is applied to the sheet (see, for example, Patent Document 1).

Patent Document 1: JP-A-60-15120

However, in order to draw a polyester resin by the above-mentioned crystalline polymeric sheet producing process, the polyester resin is too hard at low temperature that the resin lacks flexibility necessary for being drawn. At high temperature, orientation-relaxation takes priority. Therefore, in order to yield an oriented sheet excellent in strength and modulus of elasticity, it is necessary to subject the resin to pultrusion-molding in the temperature range from the glass transition temperature of the polyester resin −20° C. to the glass transition temperature +20° C. However, the oriented polyester resin sheet, which is subjected to the pultrusion-molding, has a drawback that when the sheet is heated to the glass transition temperature or higher, modulus of elasticity falls suddenly.

In the meantime, a vinyl chloride based resin is excellent in water resistance, flame resistance, mechanical properties and others, and is further relatively inexpensive; therefore, the resin is widely used as a material for building members. For example, gutters are generally formed by extruding a rigid vinyl chloride based resin.

However, the linear expansion coefficient of rigid vinyl chloride based resin molded bodies is as large as $7.0 \times 10^{-5}$ (1/° C.); therefore, when gutters made of rigid vinyl chloride based resin are set up, it is necessary to joint the gutters to each other through a joint which can absorb the stretch and shrinkage of the gutters, or make an end of each of the gutters free. However, when the whole length of the set-up gutters becomes long, the number of joints or shoots becomes large. Thus, there is generated a drawback that the external appearance is bad.

For this reason, various investigations have been made about gutters having a low linear expansion coefficient. For example, suggested is a vinyl chloride based resin gutter comprising a vinyl chloride based resin composition wherein 20 to 35 parts by weight of mica, 20 to 40 parts by weight of calcium carbonate and 5 to 15 parts by weight of a processing aid are added to 100 parts by weight of a vinyl chloride resin (see, for example, Patent Document 2).

Patent Document 2: Japanese Patent No. 2905260

In the gutter, mica and calcium carbonate are added to a vinyl chloride based resin, thereby making the linear expansion coefficient of the gutter low. However, the gutter is made mainly of the vinyl chloride based resin; if the added amount of mica and calcium carbonate is small, the linear expansion coefficient is still high. If the added amount is made high, the gutter has a drawback that the impact resistance and the durability thereof fall.

Suggested is also a gutter which is impregnated with glass fiber as a reinforcing material or a gutter on which a metallic thin plate is laminated. For example, suggested are a composite molded product in which a composite sheet comprising a thermoplastic resin and a reinforcing fiber is shaped to have a required sectional shape, a thermoplastic resin is extruded onto the surfaces thereof to coat the surfaces, and further the reinforcing fiber, which is a short fiber, is oriented at random in at least the shaped region of the composite sheet (see, for example, Patent Document 3), a gutter wherein a metallic thin plate is used as a core member, both surfaces of this core member are each coated with a synthetic resin to form a sheet member, and the tip of a bending tool is pushed against this sheet member to bend/form the member to have a substantially "U-shaped" section, characterized in that a concave groove along which the tip of the bending tool is to be guided is made at an inner-face-side position where the synthetic resin is bent (see, for example, Patent Document 4), and others.

Patent Document 3: JP-A-11-19998

Patent Document 4: JP-A-9-279783

However, in the former gutter, it is essential to form a composite sheet comprising a thermoplastic resin and a reinforcing fiber wherein short fiber pieces are oriented at random, shape the sheet to have a required sectional shape, and subsequently extrude a thermoplastic resin for coating onto the surface thereof; thus, the production is difficult and further when the gutter is disposed of, a problem is caused.

In the latter gutter, a metallic thin plate is laminated as its core member; therefore, the weight becomes large and the work for cutting the gutter is difficult. Furthermore, in ends of the gutter, the metallic thin plate is uncovered; therefore, with the passage of time, the plate rusts so as to result in a drawback that the durability is lowered by corrosion thereof.

Furthermore, as a gutter having a low linear expansion coefficient without using any core member made of a metallic thin plate or any glass fiber, the following is suggested: a polyolefin molded body which has an average linear expansion coefficient of $5 \times 10^{-5}$ (1/° C.) or less at temperatures of 20 to 80° C. and is obtained by putting, onto a surface of a polyolefin oriented material having an average linear expansion coefficient of $5 \times 10^{-5}$ (1/° C.) or less at temperatures of 20 to 80° C., a low molecular weight compound in which the polyolefin can be dissolved, and then pressing/heating the resultant to bond the polyolefin oriented material (see, for example, Patent Document 5). Suggested are also a synthetic resin gutter in which a thermoplastic synthetic resin has a linear expansion coefficient of $6 \times 10^{-5}$/° C. or less and a thickness of more than 0.5 mm and is obtained by extruding a thermoplastic resin, and then drawing this extruded body to stretch the body, thereby orienting molecules therein in a single direction (see, for example, Patent Document 6), and others.

Patent Document 5: JP-A-10-291250

Patent Document 6: JP-A-2002-285685

However, the former gutter is a sheet wherein a polyolefin oriented material is highly drawn into a draw ratio of 20 to 40, and thus the gutter has drawbacks that the gutter is easily cracked along the draw direction and the impact resistance is poor. When an attempt is made to laminate a rigid vinyl chloride based resin, AES resin or the like thereon in order to prevent the drawbacks, there is generated a drawback that the oriented state of the polyolefin is turned into disorder to make the linear expansion coefficient high since the polyolefin has a lower melting point than the above-mentioned resins.

Additionally, the latter gutter has drawbacks that the gutter is easily cracked along the draw direction and the impact resistance is poor since the gutter is produced only by drawing a gutter obtained by extrusion molding.

DISCLOSURE OF THE INVENTION

Problems to be Solved by the Invention

In light of the above-mentioned drawbacks, an object of the present invention is to provide a process for producing an oriented thermoplastic polyester resin sheet excellent in tensile strength, tensile modulus, and heat resistance.

Another object of the present invention is to provide a light laminate-molded body which has a low linear expansion coefficient and is excellent in impact resistance, durability, easiness of handling, productivity and others, in particular, a laminate-molded body which can be used suitably as an exterior building member, such as a gutter, using the above-mentioned oriented thermoplastic polyester resin sheet.

Means for Solving the Problems

The process of the present invention for producing an oriented thermoplastic polyester resin sheet comprises: pultrusion-drawing a thermoplastic polyester resin sheet in an amorphous state at a temperature from the glass transition temperature of the oriented thermoplastic polyester resin −20° C. to the glass transition temperature of the thermoplastic polyester resin +20° C.; and then drawing the resultant uniaxially at a temperature higher than the temperature for the pultrusion-drawing.

Examples of the thermoplastic polyester resin used in the present invention include polyethylene terephthalate, polybutylene terephthalate, polytrimethylene terephthalate, polyglycolic acid, poly(L-lactic acid), poly(3-hydroxybutyrate), poly(3-hydroxybutyrate/hydroxy valerate), poly(ε-caprolactone), polyethylene succinate, polybutylene succinate, polybutylene succinate adipate, polybutylene succinate/lactic acid, polybutylene succinate/carbonate, polybutylene succinate/terephthalate, polybutylene adipate/terephthalate, polytetramethylene adipate/terephthalate, and polybutylene succinate/adipate/terephthalate. Polyethylene terephthalate, which is excellent in heat resistance, is preferred.

If the intrinsic viscosity of the thermoplastic polyester resin is too low, drawdown is easily caused when a sheet is produced therefrom. If the intrinsic viscosity is too high, the mechanical strengths (in particular, modulus of elasticity) are not raised even if the sheet is drawn. Thus, the intrinsic viscosity is preferably from 0.6 to 1.0.

The thickness of the thermoplastic polyester resin sheet is not particularly limited, and is preferably from 0.5 to 5 mm. If the thickness is less than 0.5 mm, the sheet thickness is too thin after the sheet is drawn. Consequently, the strength may not be sufficient when the sheet is handled. If the thickness is more than 5 mm, the sheet may not be easily drawn.

The thermoplastic polyester resin sheet is in an amorphous state. The crystallinity of the thermoplastic polyester resin sheet is not particularly limited as long as the sheet is in an amorphous state. The crystallinity measured with a differential scanning calorimeter is preferably less than 10%, more preferably less than 5%.

In the present invention, the above-mentioned thermoplastic polyester resin sheet in an amorphous state is subjected to pultrusion-drawing. The method for the pultrusion-drawing is not particularly limited, and the sheet may be subjected to pultrusion-drawing by passing the sheet through a pultrusion-mold having a predetermined clearance. Preferably, the sheet is subjected to pultrusion-drawing by passing the sheet between a pair of rolls since the thickness after drawing can be controlled at will and further it never happens that a specific moiety of a pultrusion-mold is worn down.

The temperature of the thermoplastic polyester resin sheet when the sheet is subjected to the pultrusion-drawing is not particularly limited. It is preferred to pre-heat the sheet at a temperature close to the glass transition temperature.

The pre-heating temperature is preferably from the glass transition temperature of the thermoplastic polyester resin −20° C. to the glass transition temperature of the thermoplastic polyester resin +10° C.

Whether the pre-heating temperature is too low or too high, the temperature of the resin sheet may not become a predetermined temperature.

If the temperature when the pultrusion-drawing is performed is low, the thermoplastic polyester resin sheet is too hard. Thus, even if an attempt is made to pull out the sheet, the sheet may be cut prior to the pulling-out. Even if the sheet is not cut, there arises a problem that voids are generated so that the sheet whitens or the like. If the temperature becomes high, the thermoplastic polyester resin sheet becomes soft so that the sheet is cut by tension for pulling out the sheet. Accordingly, the temperature is from the glass transition temperature of the thermoplastic polyester resin −20° C. to the glass transition temperature of the thermoplastic polyester resin +20° C., preferably from the glass transition temperature of the thermoplastic polyester resin to the glass transition temperature of the thermoplastic polyester resin +10° C.

When the thermoplastic polyester resin sheet in an amorphous state is pulled out, the rolls do not necessarily need to be rotated. In particular, when the thermoplastic polyester resin sheet is thick, it is preferred to rotate the rolls in the pulling direction since a rise in the temperature of the sheet is easily caused by heat storage into the rolls based on shear-heat-generation.

If the rotating speed of the rolls is slow, the time during which the rolls contact the thermoplastic polyester resin sheet is long so that frictional heat is generated to raise the roll temperature. Thus, an effect of cooling the heated thermoplastic polyester resin lowers. As a result, the temperature thereof exceeds the predetermined pultrusion-drawing temperature. Conversely, if the rotating speed of the rolls is fast, only the thermoplastic polyester resin in the surface of the thermoplastic polyester resin sheet flows so that the sheet cannot be uniformly pultrusion-drawn. Thus, modulus of elasticity of the resultant pultrusion-drawn thermoplastic polyester resin sheet falls.

It is therefore preferred that the rotating speed of the rolls is a speed not higher than a speed substantially equal to the sheet-feeding speed when the thermoplastic polyester resin sheet is pulled out at a pulling speed under the same condition in a state that the rolls are not rotated.

If the thermoplastic polyester resin sheet is thick (1.5 mm or more), heat is largely generated by shear of the rolls and the sheet. It is therefore preferred that the rotating speed of the rolls is from 50 to 100% of the above-mentioned sheet-feeding speed. If the thermoplastic polyester resin sheet is thin, the rotating speed of the rolls may be slow since the cooling effect based on the rolls is large.

The draw ratio of the above-mentioned pultrusion-drawing is not particularly limited. If the draw ratio is low, a sheet excellent in tensile strength and tensile modulus cannot be obtained. If the draw ratio becomes high, the sheet comes to be easily broken when drawn. Thus, the draw ratio is preferably from 2 to 9, more preferably from 4 to 8.

In the present invention, the thermoplastic polyester resin sheet undergoing the pultrusion-drawing is uniaxially drawn at a temperature higher than the temperature for the pultrusion-drawing.

In the polyester resin of the thermoplastic polyester resin sheet undergoing the pultrusion-drawing, the molecular chains thereof are highly oriented in a state that isotropic crystallization based on heat and orientation, which hinder the sheet from being drawn, are restrained; thus, the resin is excellent in strength and modulus of elasticity but is low in crystallinity. Thus, when the sheet is heated, the orientation is easily relaxed to result in a drawback that modulus of elasticity lowers.

However, when this thermoplastic polyester resin sheet undergoing the pultrusion-drawing is uniaxially drawn at a temperature higher than the temperature for the pultrusion-drawing, the crystallinity rises without relaxing the orientation. Thus, an oriented sheet is obtained which has an orientation that is not easily relaxed even if the sheet is heated and which has an excellent heat resistance.

The method used for the uniaxial drawing is preferably a roll drawing method. The roll drawing method is a method of sandwiching an original sheet between two pairs of rolls different from each other in speed, and drawing the original sheet while heating the original sheet, whereby molecules therein can be oriented intensely only in a uniaxial direction.

It is sufficient that the temperature when the uniaxial drawing is performed is a higher temperature than the temperature for the pultrusion-drawing. The temperature is preferably in the range of temperatures from the rise-up temperature of the crystallization peak of the thermoplastic polyester resin in its differential scanning calorie curve measured at a temperature-raising rate of 10° C./min. to the rise-up temperature of the melting peak thereof in the curve since the thermoplastic polyester resin sheet undergoing the pultrusion-drawing is melted and cut if the temperature is too high.

The rise-up temperature of the crystallization peak of polyethylene terephthalate is about 120° C., and the rise-up temperature of the melting peak thereof is about 230° C. Accordingly, when a polyethylene terephthalate sheet is uniaxially drawn, the uniaxial drawing is performed preferably at about 120° C. to about 230° C.

The draw ratio of the uniaxial drawing is not particularly limited. If the draw ratio is low, a sheet excellent in tensile strength and tensile modulus is not obtained. If the ratio becomes high, the sheet comes to be easily broken when drawn. Thus, the draw ratio is preferably from 1.05 to 3, more preferably from 1.1 to 2. The total draw ratio of the pultrusion-drawing and the uniaxial drawing is preferably from 2.5 to 10 for the same reasons.

In the present invention, it is preferred to heatset the oriented thermoplastic polyester resin sheet undergoing the uniaxial drawing in order to make the heat resistance higher.

If the heatsetting temperature is lower than the rise-up temperature of the crystallization peak of the thermoplastic polyester resin in its differential scanning calorie curve measured at a temperature-raising rate of 10° C./min., the crystallization of the thermoplastic polyester resin does not advance so that the heat resistance is not improved. If the temperature is higher than the rise-up temperature of the melting peak thereof, the thermoplastic polyester resin is melted so that the drawing (orientation) becomes extinct to lower tensile modulus, the tensile strength and so on. If the temperature is higher than the uniaxial drawing temperature by 30° C. or more, the orientation of the crystal obtained by crystallization at the uniaxial drawing temperature is relaxed. Thus, the temperature is preferably a temperature that ranges from the rise-up temperature of the crystallization peak of the thermoplastic polyester resin in the differential scanning calorie curve measured at a temperature-raising rate of 10° C./min. to the rise-up temperature of the melting peak thereof and that is a temperature not higher than the uniaxial drawing temperature by 30° C. or more.

If large tension is applied to the oriented thermoplastic polyester resin sheet when the sheet is heatsetted, the sheet is drawn. If no tension or very small tension is applied thereto, the sheet is shrunken. It is therefore preferred to perform the heatset in a state that the length of the oriented thermoplastic polyester resin sheet does not substantially change. In addition, it is preferred to apply no pressure to the oriented thermoplastic polyester resin sheet.

Specifically, it is preferred to perform the heatset in such a manner that the length of the oriented thermoplastic polyester resin sheet undergoing the heatset is 0.95 to 1.1 times that of the oriented thermoplastic polyester resin sheet before the heatset and further a ratio lower than the uniaxial draw ratio is given.

Accordingly, when the heatset of the oriented thermoplastic polyester resin sheet is continuously performed while the sheet is shifted inside a heating room by means of rolls such as pinch rolls, it is preferred to set the feeding-speed ratio of the oriented thermoplastic polyester resin sheet between inlet and outlet sides to a value lower than the uniaxial draw ratio within the range of 0.95 to 1.1.

The method for heating in the heatset is not particularly limited, and may be, for example, a heating method using hot wind, a heater or the like.

The time for the heatset is not particularly limited. In general, the time, which is varied in accordance with the thickness of the oriented thermoplastic polyester resin sheet or the heatset temperature, is preferably from 10 seconds to 10 minutes.

Furthermore, it is preferred that the oriented thermoplastic polyester resin sheet undergoing the heatset is annealed at a temperature in the range of the glass transition temperature to the rise-up temperature of the crystallization peak of the thermoplastic polyester resin in its differential scanning calorie curve measured at a temperature-raising rate of 10° C./min. in a state that substantially no tension is applied to the sheet.

The annealing makes it possible that the oriented thermoplastic polyester resin sheet is good in mechanical properties such as modulus of elasticity and even if the sheet is heated to the glass transition temperature or higher, the mechanical properties such as modulus of elasticity are not lowered and the shrinkage ratio is controlled to a low value.

When the sheet is annealed, the oriented thermoplastic polyester resin sheet is drawn if large tension is applied to the sheet. It is therefore preferred to anneal the oriented thermoplastic polyester resin sheet in a state that substantially no tension is applied to the sheet.

Specifically, it is preferred to perform annealing making the length of the annealed oriented thermoplastic polyester resin sheet equal to or shorter than that of the sheet before the annealing.

Accordingly, when the annealing of the oriented thermoplastic polyester resin sheet is continuously performed while the sheet is shifted inside a heating room by means of rolls such as pinch rolls, it is preferred to perform the annealing in such a manner that the feeding-speed ratio of the oriented thermoplastic polyester resin sheet between inlet and outlet sides is set to 1.0 or less.

When the sheet which is a short sheet is annealed, it is preferred to perform the annealing in such a manner that both ends thereof are made open in order not to apply a load.

The heating method in the annealing is not particularly limited, and may be, for example, a heating method using hot wind, a heater or the like.

The time for the annealing is not particularly limited. In general, the time, which is varied in accordance with the thickness of the oriented thermoplastic polyester resin sheet or the annealing temperature, is preferably 10 seconds or more, more preferably from 30 seconds to 60 minutes, and even more preferably from 1 to 20 minutes.

The oriented thermoplastic polyester resin sheet of the present invention is an oriented thermoplastic polyester resin sheet produced by the above-mentioned production process.

To produce an oriented thermoplastic polyester resin sheet having a linear expansion coefficient of less than $-1.5 \times 10^{-5}/°$ C., energy necessary for the production is large so that the economical efficiency is bad. If the coefficient is $0/°$ C. or more, the linear expansion coefficient of a laminate-molded body wherein a thermoplastic resin layer is laminated onto each of the surfaces of the oriented thermoplastic polyester resin sheet is large. Thus, the linear expansion coefficient of the oriented thermoplastic polyester resin sheet is preferably $-1.5 \times 10^{-5}/°$ C. or more and less than $0/°$ C.

If tensile modulus of the oriented thermoplastic polyester resin sheet is less than 7 GPa, the linear expansion coefficient of a laminate-molded body wherein a thermoplastic resin layer is laminated onto each of the surfaces of the oriented thermoplastic polyester resin sheet is large. If tensile modulus is more than 15 GPa, the impact resistance of the laminate-molded body falls. Thus, tensile modulus of the oriented thermoplastic polyester resin sheet is preferably from 7 to 15 GPa.

The laminate-molded body of the present invention is a body wherein a thermoplastic resin layer is laminated on each of the surfaces of the above-mentioned oriented thermoplastic polyester resin sheet.

The above-mentioned oriented thermoplastic polyester resin sheets may be laminated in a number of 2 or more. When these sheets are laminated, it is preferred to laminate the sheets to make the draw directions thereof substantially the same.

The method that may be adopted to laminate the oriented thermoplastic polyester resin sheets onto each other may be any method known in the prior art. It is preferred to bond the sheets through a hot melt adhesive of a polyester type, a polyolefin type, or some other type which has a lower melting point than that of the thermoplastic polyester resin which constitutes the oriented thermoplastic polyester resin sheets since the drawing of these sheets is relaxed when the sheets are thermally melt-bonded onto each other at high temperature.

The method for bonding the sheets through the hot melt adhesive is not particularly limited, and may be, for example, a method of applying the hot melt adhesive which is in a melted state onto at least one of the oriented thermoplastic polyester resin sheets and simultaneously laminating and melt-bonding the two onto each other; or a method of applying the hot melt adhesive which is in a melted state onto at least one of the oriented thermoplastic polyester resin sheets, cooling the resultant to form a hot melt adhesive layer, and subsequently laminating the sheets onto each other, or interposing the hot melt adhesive in a sheet form between the oriented thermoplastic polyester resin sheets, the number of which is two or more, and heating the resultant laminate to melt the hot melt adhesive, thereby melt-bonding the sheets.

In the case of the latter method of melting the hot melt adhesive to melt-bond the sheets, it is preferred to use an ultrasonic welder to melt the hot melt adhesive to melt-bond the sheets.

For the above-mentioned method, in which an ultrasonic welder is used to melt-bond the sheets, any method known in the prior art may be adopted. Examples thereof include a method of passing a laminate made of the above-mentioned oriented thermoplastic polyester resin sheets, the hot melt adhesive, a woven cloth and/or nonwoven cloth, thermoplastic resin layers and others between a horn vibrated at a frequency of 15 to 40 kHz and a knurling tool.

FIG. 1 is an explanatory view illustrating an example of a method of bonding two oriented thermoplastic polyester resin sheets through a hot melt adhesive by means of an ultrasonic welder.

In FIG. 1, reference numbers 1,1 represents an oriented thermoplastic polyester resin sheet, and a hot melt adhesive sheet 2 is interposed between the drawn thermoplastic polyester resin sheets 1 and 1 to form a laminate 10.

The laminate 10 is transferred in a state that the laminate 10 is pressed by means of a horn 3 and a knurling tool 4 while vibration having a frequency of 15 to 40 kHz is applied to the laminate 10 from the horn 3, thereby heating the hot melt adhesive sheet 2 instantaneously by frictional heat from the ultrasonic vibration transmitted from the horn 3, so as to melt the adhesive to melt-bond the sheets.

At this time, in order to melt-bond the sheets more efficiently, it is preferred to make the interval between the horn 3 and the knurling tool 4 smaller than the thickness of the laminate 10, thereby melt-bonding the sheets while pressing the laminate 10 by means of the horn 3 and the knurling tool 4.

For the pressing, it is preferred to connect an air cylinder, a hydraulic cylinder or the like to the horn 3, and press the horn 3 against the knurling tool 4 with the laminate 10 interposed therebetween.

Projections are made in a surface of the knurling tool 4, so that the melt-bonding can be more efficiently attained. By changing the arrangement or shape of the projections, the arrangement or the shape of the melt-bonded moieties can be changed.

FIGS. 2 to 6 are each an explanatory view illustrating an example of the arrangement pattern of the melt-bonded moieties. In each of the figures, a reference number 11 represents a laminate-molded body wherein sheets are melt-bonded by means of an ultrasonic welder. A symbol A represents the draw direction of the oriented thermoplastic polyester resin sheets, and a reference number 5 represents a melt-bonded moiety.

When the sheets are melt-bonded by means of an ultrasonic welder, it is preferred to apply tension to the laminate 10 (the oriented thermoplastic polyester resin sheets 1) to restrain the relaxation of the orientation state of the oriented thermoplastic polyester resin sheets 1.

An example of the method for laminating different oriented thermoplastic polyester resin sheets onto each other is a method of bonding the sheets through one or more adhesive(s) selected from the group consisting of a reactive adhesive, an epoxy adhesive, a urethane adhesive, a polyester adhesive, and a rubbery adhesive.

A woven cloth and/or nonwoven cloth may be interposed between oriented thermoplastic polyester resin sheets. When the woven cloth and/or nonwoven cloth is/are interposed therebetween, the bondability of the oriented thermoplastic polyester resin sheets is improved. As a result, the resultant laminate-molded body has improved tensile strength, impact resistance and other properties.

The woven cloth and/or nonwoven cloth is/are not particularly limited. Any woven cloth and any nonwoven cloth known in the prior art may be used. Examples thereof include a woven cloth and/or nonwoven cloth made of a natural fiber such as cotton or staple fiber, a synthetic fiber such as polyethylene fiber, polypropylene fiber, polyester fiber, nylon fiber, vinylon fiber, acrylic fiber, and aramid fiber, or an inorganic fiber such as glass fiber and carbon fiber.

The weight per unit area of the woven cloth and/or nonwoven cloth, the thickness thereof, and other properties thereof are not particularly limited. In general, the weight per unit area is preferably from 10 to 500 g/m$^2$, and the thickness is preferably from 0.03 to 4 mm.

As the method for interposing the woven cloth and/or nonwoven cloth between the oriented thermoplastic polyester resin sheets, any method known in the prior art may be adopted. It is preferred to bond them through a hot melt adhesive of a polyester type, a polyolefin type or some other type which has a lower melting point than that of the thermoplastic polyester resin which constitutes the oriented thermoplastic polyester resin sheets, or through one or more adhesive(s) selected from the group consisting of a reactive adhesive, an epoxy adhesive, a urethane adhesive, a polyester adhesive, and a rubbery adhesive since the thermal relaxation of the oriented thermoplastic polyester resin sheets is restrained.

In order to interpose the woven cloth and/or nonwoven cloth between the oriented thermoplastic polyester resin sheets more easily and bond the cloth(s) thereto more strongly to improve the impact resistance, it is preferred to interpose the woven cloth and/or nonwoven cloth impregnated with a hot melt adhesive having a lower melting point than that of the thermoplastic polyester resin between the oriented thermoplastic polyester resin sheets, and bond the cloth(s) thereto.

In this case, it is preferred to heat the hot melt adhesive by means of an ultrasonic welder to melt-bond the cloth(s) to the sheets.

Preferred is also a method of interposing, between the oriented thermoplastic polyester resin sheets, the woven cloth and/or nonwoven cloth impregnated with one or more adhesive(s) selected from the group consisting of a reactive adhesive, an epoxy adhesive, a urethane adhesive, a polyester adhesive, and a rubbery adhesive.

The laminate-molded body of the present invention is a body wherein a thermoplastic resin layer is laminated on each of the surfaces of the oriented thermoplastic polyester resin sheet.

The thermoplastic resin is laminated on each of the surfaces of the oriented thermoplastic polyester resin sheet, and is a material for protecting the oriented thermoplastic polyester resin sheet so as not to generate a crack or a cleavage along the draw direction by an impact, and for preventing the polyester resin from being hydrolyzed or deteriorated to lower the durability when the resin is directly exposed to rainwater or sunlight.

Examples of the thermoplastic resin include rigid vinyl chloride resin, chlorinated vinyl chloride resin, chlorinated polyethylene resin, ABS resin, AES resin, styrene resin, AS resin, methyl methacrylate resin, polyethylene resin, and polypropylene resin. It is allowable to use paint such as fluorine paint, acrylic silicone paint, or urethane paint.

In the case that the thermoplastic resin is melted to be laminated onto each of the surfaces of the oriented thermoplastic polyester resin sheet, the crystal of the oriented thermoplastic polyester resin sheet is relaxed to make the linear expansion coefficient high if the melting point of the thermoplastic resin is higher than that of the thermoplastic polyester resin. It is therefore preferred that the thermoplastic resin is a resin which can be molded at a temperature lower than the melting point of the thermoplastic polyester resin.

The thickness of the thermoplastic resin is not particularly limited, and may be appropriately decided in accordance with the usage thereof. If the resin is too thin, the above-mentioned protecting effect deteriorates. If the resin becomes thick, the resin becomes heavy and further the effect of a low linear expansion coefficient of the oriented thermoplastic polyester resin sheet is decreased. Thus, the thickness is preferably from 0.1 to 3 mm.

The method for laminating the thermoplastic resin layer onto each of the surfaces of the oriented thermoplastic polyester resin sheet is not particularly limited, and may be any laminating method known in the prior art. Examples thereof include the following methods.

(1) A method of extruding the thermoplastic resin, for coating, onto each of the surfaces of the oriented thermoplastic polyester resin sheet, and laminating the resin on each of the surfaces.

(2) A method of bonding a thermoplastic resin sheet onto each of the surfaces of the oriented thermoplastic polyester resin sheet by hot press, so as to laminate the sheet thereon.

(3) A method of bonding a thermoplastic resin sheet onto each of the surfaces of the oriented thermoplastic polyester resin sheet through a hot melt adhesive of a polyester type, a polyolefin type or some other type which has a lower melting point than that of the thermoplastic polyester resin which constitutes the oriented thermoplastic polyester resin sheet, so as to laminate the sheet thereon.

(4) A method of bonding a thermoplastic resin sheet onto each of the surfaces of the oriented thermoplastic polyester resin sheet through an adhesive such as a reactive adhesive, an epoxy adhesive, a urethane adhesive, a polyester adhesive, or a rubbery adhesive, so as to laminate the sheet thereon.

In order to make the adhesion force high in the above-mentioned methods, the following methods are adopted.

(a) A method of shaving the surfaces of the oriented thermoplastic polyester resin sheet to make irregularities in the surfaces, and extruding the thermoplastic resin, for coating, onto each of the surfaces or pushing the thermoplastic resin sheet onto each of the surfaces, thereby laminating the resin or resin sheet thereon by an anchor effect.

(b) A method of making many through holes in the oriented thermoplastic polyester resin sheet, and extruding the thermoplastic resin, for coatings, onto each of the surfaces or pushing the thermoplastic resin sheet onto each of the surfaces, thereby melt-bonding the thermoplastic resin sheets on the two surfaces onto the polyester resin sheet through the holes so as to laminate the sheets thereon.

(c) A method of laminating, onto the oriented thermoplastic polyester resin sheet, adhesive layers made of a hot melt adhesive of a polyester type, a polyolefin type or some other type which has a lower melting point than that of the thermoplastic polyester resin which constitutes the oriented thermoplastic polyester resin sheet and that of the thermoplastic resin which constitutes the thermoplastic resin layer; melting and extruding the thermoplastic resin, for coating, onto each of the adhesive layers, or pushing the thermoplastic resin sheet onto each of the adhesive layers and heating the resultant, thereby melt-bonding the sheet thereon.

(d) A method of interposing, between the oriented thermoplastic polyester resin sheet and the thermoplastic resin layers, a sheet-form hot melt adhesive of a polyester type, a polyolefin type or some other type which has a lower melting point than that of the thermoplastic polyester resin which constitutes the oriented thermoplastic polyester resin sheet and that of the thermoplastic resin which constitutes the thermoplastic resin layers; and then heating the hot melt adhesive, thereby melting the adhesive to bond the oriented sheet and the resin layers.

In this method, it is preferred to melt the hot melt adhesive by means of the above-mentioned ultrasonic welder.

A woven cloth and/or nonwoven cloth may be interposed between the oriented thermoplastic polyester resin sheet and the thermoplastic resin layers. When the woven cloth and/or nonwoven cloth is/are interposed therebetween, the adhesiveness between the oriented thermoplastic polyester resin sheet and the thermoplastic resin layers is improved and the tensile strength, the impact resistance and other properties of the resultant laminate-molded body are improved.

The woven cloth and/or nonwoven cloth is/are not particularly limited, and any woven cloth and/or nonwoven cloth known in the prior art can be used. Examples thereof include a woven cloth and/or nonwoven cloth made of a natural fiber such as cotton or staple fiber, a synthetic fiber such as polyethylene fiber, polypropylene fiber, polyester fiber, nylon fiber, vinylon fiber, acrylic fiber, and aramid fiber, or an inorganic fiber such as glass fiber and carbon fiber.

The weight per unit area of the woven cloth and the nonwoven cloth, the thickness thereof, and other properties thereof are not particularly limited. In general, the weight per unit area is preferably from 10 to 500 g/m$^2$, and the thickness is preferably from 0.03 to 4 mm.

When the woven cloth and/or nonwoven cloth is/are interposed between the oriented thermoplastic polyester resin sheet and the thermoplastic resin layers, it is preferred that this oriented thermoplastic polyester resin sheet is bonded to the woven cloth and/or nonwoven cloth.

The method for the bonding may be a method of melt-bonding, thermally, the woven cloth and/or nonwoven cloth which is/are made of a thermoplastic resin onto the oriented thermoplastic polyester resin sheet; a method of needle-punching a laminate wherein the woven cloth and/or nonwoven cloth is/are laminated on the oriented thermoplastic polyester resin sheet, thereby entangling fibers which form the woven cloth and/or nonwoven cloth into the holes or fissures made in the oriented thermoplastic polyester resin sheet; or the like.

In particular, when the thermoplastic resin woven cloth and/or nonwoven cloth is/are thermally melt-bonded to the oriented thermoplastic polyester resin sheet and the thermoplastic resin layers penetrate into the woven cloth and/or nonwoven cloth so as to be bonded to the cloth(s), the oriented thermoplastic polyester resin sheet and the thermoplastic resin layers can be strongly bonded to each other without using any adhesive. Additionally, it is possible to omit the step of applying, drying and curing an adhesive.

Furthermore, when the woven cloth and/or nonwoven cloth is/are made of a thermoplastic polyester resin, the affinity between the oriented thermoplastic polyester resin sheet and the woven cloth and/or nonwoven cloth is made high so that the thermal melt-bonding strength therebetween is improved.

It is particularly preferred that the woven cloth and/or nonwoven cloth is/are made of the same resin as the thermoplastic polyester resin sheet from the viewpoint of an improvement in the thermal melt-bonding strength and easiness of recycle of a waste material generated in the process.

The method for melt-bonding the thermoplastic resin woven cloth and/or nonwoven cloth thermally onto each of the surfaces of the oriented thermoplastic polyester resin sheet may be:

1) a method of laminating the oriented thermoplastic polyester resin sheet onto the thermoplastic resin woven cloth and/or nonwoven cloth, melting them by means of an ultrasonic welder in a state that pressure is applied to the laminate, and then cooling the laminate to solidify, or 2) a method of laminating the oriented thermoplastic polyester resin sheet onto the thermoplastic resin woven cloth and/or nonwoven cloth, sandwiching the laminate between a pair of knurling tools the temperature of which is set to not lower than the melting point of each of the resins which constitute the oriented thermoplastic polyester resin sheet and the thermoplastic resin woven cloth and/or nonwoven cloth, pulling out the laminate while melting the moieties which contact projections of the knurling tools, and then cooling the laminate.

At the time of the thermal melt-bonding, it is preferred to apply tension to the oriented thermoplastic polyester resin sheet in order to prevent the sheet from being relaxed.

In the case of using, in the method 1), the same arrangement pattern with the melt-bonded moieties between the nonwoven cloth and the oriented thermoplastic polyester resin sheet in FIGS. 2 to 6, the relaxation of this oriented thermoplastic polyester resin sheet based on the thermal melt-bonding is reduced to a minimum.

In the method 2), the projections of the knurling tools opposite to each other at this time are arranged symmetrically with respect to the laminate composed of the oriented thermoplastic polyester resin sheet and the thermoplastic resin woven cloth and/or nonwoven cloth.

In the case of laminating the thermoplastic resin woven cloth and/or nonwoven cloth onto each of the surfaces of the oriented thermoplastic polyester resin sheet, it is allowable to laminate the cloth(s) onto the surfaces simultaneously or successively.

The method adopted for laminating the oriented thermoplastic polyester resin sheet onto the woven cloth and/or nonwoven cloth, and laminating the woven cloth and/or nonwoven cloth onto each of the thermoplastic resin layers may be any method known in the prior art. When the lamination is desired to be attained at a temperature lower than the thermal melt-bonding temperature, it is preferred to attain the bonding through a hot melt adhesive of a polyester type, a polyolefin type or some other type which has a melting point lower than that of the thermoplastic polyester resin which constitutes the oriented thermoplastic polyester resin sheet or through one or more adhesive(s) selected from the group consisting of a reactive adhesive, an epoxy adhesive, a urethane adhesive, a polyester adhesive, and a rubbery adhesive since the drawing of the oriented thermoplastic polyester resin sheet is relaxed if the sheet is heated at high temperature.

In order to laminate the oriented thermoplastic polyester resin sheet onto the woven cloth and/or nonwoven cloth, and laminate the woven cloth and/or nonwoven cloth onto each of the thermoplastic resin layers more easily and then bond them to each other strongly to improve the impact resistance, it is preferred to interpose, between the oriented thermoplastic polyester resin sheet and the thermoplastic resin layers, the woven cloth and/or nonwoven cloth which is/are impregnated with a hot melt adhesive having a lower melting point than that of the thermoplastic polyester resin and that of the thermoplastic resin which constitutes the thermoplastic resin layers, and then bond the cloth(s) thereto.

In this case also, it is preferred to laminate the woven cloth and/or nonwoven cloth impregnated with the hot melt adhesive and the thermoplastic resin layers onto the oriented thermoplastic polyester resin sheet, and then melt-bond them onto each other by means of an ultrasonic welder.

In order to laminate the oriented thermoplastic polyester resin sheet onto the woven cloth and/or nonwoven cloth, and the woven cloth and/or nonwoven cloth onto each of the thermoplastic resin layers more easily and bond them to each other strongly to improve the impact resistance, it is allowable to interpose, between the oriented thermoplastic polyester resin sheet and the thermoplastic resin layers, the woven cloth and/or nonwoven cloth impregnated with one or more adhesive(s) selected from the group consisting of a reactive adhesive, an epoxy adhesive, a urethane adhesive, a polyester adhesive, and a rubbery adhesive and then bond the cloth(s) thereto.

The above-mentioned oriented thermoplastic polyester resin sheet and the above-mentioned laminate-molded body can each be molded into a predetermined shape by a molding method such as profile molding and bending molding. A laminate-molded body having the predetermined shape can be obtained.

In order to improve the weatherability or the designability of the laminate-molded body, it is allowable to laminate, onto the surface of each of the thermoplastic resin layers, a different resin layer, or apply paint on the surface.

The laminate-molded body of the present invention can be used suitably as an exterior building member, in particular, a gutter.

Effects of the Invention

The process of the present invention for producing an oriented thermoplastic polyester resin sheet is as described above, and the resultant oriented thermoplastic polyester resin sheet is excellent in tensile strength, tensile modulus, and heat resistance. In particular, the oriented thermoplastic polyester resin sheet which undergoes heatset after the uniaxial drawing and the oriented thermoplastic polyester resin sheet which further undergoes annealing are more excellent in heat resistance.

In the laminate-molded body of the present invention, a thermoplastic resin is laminated onto each of the surfaces of the above-mentioned oriented thermoplastic polyester resin sheet; therefore, the body has a low linear expansion coefficient and is light and excellent in impact resistance, durability, easiness of handling, productivity, and others. Accordingly, the laminate-molded body can be used suitably as an exterior building member such as a gutter.

In order to make a thick thermoplastic polyester resin sheet to an oriented sheet, large-scaled facilities are necessary for causing a drawing machine therein to resist against a load for the drawing; therefore, more economical facilities can be installed by laminating a thin thermoplastic polyester resin sheet.

When a woven cloth and/or nonwoven cloth is/are interposed between oriented thermoplastic polyester resin sheets and/or between an oriented thermoplastic polyester resin sheet and thermoplastic resin layers, the tensile strength, the impact resistance, and other properties of the laminate-molded body are made better.

EXPLANATION OF SYMBOLS

Figure 1:
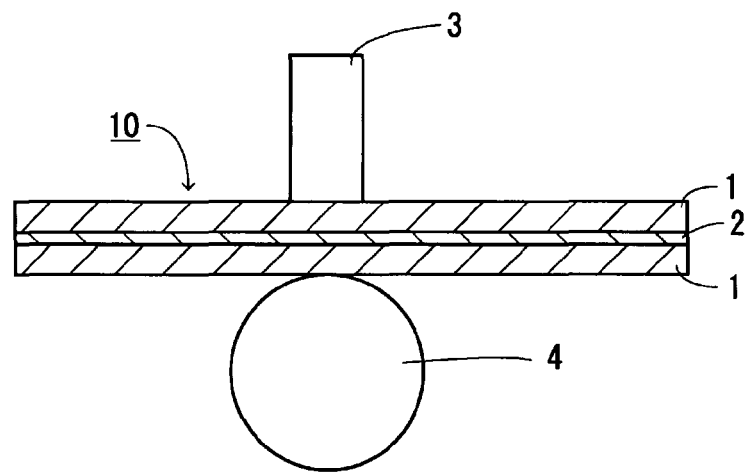
FIG. 1 It is an explanatory view illustrating an example of a method of bonding two oriented thermoplastic polyester resin sheets through a hot melt adhesive by means of ultrasonic welder.

| | |
|---|---|
| 1 | oriented thermoplastic polyester resin sheet |
| 2 | hot melt adhesive sheet |
| 3 | horn |
| 4 | knurling tool |
| 5 | melt-bonded moiety |
| 10 | laminate |
| 11 | laminate-molded body |

BEST MODE FOR CARRYING OUT THE INVENTION

Next, examples of the present invention will be described. However, the present invention is not limited to the following examples.

Example 1

A polyethylene terephthalate sheet (trade name: "A-PET SHEET FR", manufactured by Teijin Ltd., intrinsic viscosity: 0.7, crystallinity: 4%), 1 mm in thickness and 200 mm in width, was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.2 mm) heated to 80° C. and rotated at 0.05 m/min. in a draw direction, and further the sheet was heated in a hot wind heating room to set the polyethylene terephthalate sheet surface temperature to 170° C., and was subjected to roll-drawing while the outlet speed was set to 2.5 m/min. In this way, an oriented polyethylene terephthalate sheet wherein the draw ratio was about 6 was yielded. When the rolls were not rotated, the feeding speed of the sheet to the drawing apparatus was a speed of 0.4 m/min.

The glass transition temperature of the polyethylene terephthalate sheet was 72° C., and the rise-up temperature of the crystallization peak in its differential scanning calorie curve measured at a temperature-raising rate of 10° C./min. was about 118° C. The rise-up temperature of the melting peak thereof was about 230° C.

Example 2

A polyethylene terephthalate sheet (trade name: "A-PET SHEET FR", manufactured by Teijin Ltd.), 1 mm in thickness and 200 mm in width, was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.2 mm) heated to 80° C. and rotated at 0.05 m/min. in a draw direction, and further the sheet was heated in a hot wind heating room to set the polyethylene terephthalate sheet surface temperature to 130° C., and was subjected to roll-drawing while the outlet speed was set to 2.5 m/min. In this way, an oriented polyethylene terephthalate sheet wherein the draw ratio was about 6 was yielded.

Example 3

A polyethylene terephthalate sheet (trade name: "A-PET SHEET FR", manufactured by Teijin Ltd.), 1 mm in thickness and 200 mm in width, was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.2 mm) heated to 80° C. and rotated at 0.05 m/min. in a draw direction, and further the sheet was heated in a hot wind heating room to set the polyethylene terephthalate sheet surface temperature to 115° C., and was subjected to roll-drawing while the outlet speed was set to 2.5 m/min. In this way, an oriented polyethylene terephthalate sheet wherein the draw ratio was about 6 was yielded.

Example 4

A polyethylene terephthalate sheet (trade name: "A-PET SHEET FR", manufactured by Teijin Ltd.), 1 mm in thickness and 200 mm in width, was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.2 mm) heated to 80° C. and rotated at 0.05 m/min. in a draw direction, and further the sheet was heated in a hot wind heating room to set the polyethylene terephthalate sheet surface temperature to 170° C., and was subjected to roll-drawing into a draw ratio of about 6 while the outlet speed was set to 2.5 m/min. Furthermore, the rotating speed of each pair of rolls front and near for the uniaxially drawing of polyethylene terephthalate sheet, was made equal to each other so as to keep the oriented polyethylene terephthalate sheet into a state that the length thereof did not change. Hot wind of 170° C. was blown onto both surfaces of the sheet for 3 minutes to heatset the sheet, thereby yielding an oriented polyethylene terephthalate sheet wherein the draw ratio was about 6.

Comparative Example 1

A polyethylene terephthalate sheet (trade name: "A-PET SHEET FR", manufactured by Teijin Ltd.), 1 mm in thickness and 200 mm in width, was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.2 mm) heated to 80° C. and rotated at 0.05 m/min. in a draw direction. In this way, an oriented polyethylene terephthalate sheet wherein the draw ratio was about 5 was yielded.

Comparative Example 2

A polyethylene terephthalate sheet (trade name: "A-PET SHEET FR", manufactured by Teijin Ltd.), 1 mm in thickness and 200 mm in width, was supplied to a drawing apparatus (manufactured by Kyowa Engineering Co., Ltd.), and then preheated to 45° C. Thereafter, the sheet was pulled out at a speed of 2 m/min. from between a pair of rolls (roll clearance: 0.2 mm) rotated at 0.05 m/min. in a draw direction. As a result, the polyethylene terephthalate sheet was cut, and no pultrusion-drawn polyethylene terephthalate sheet was obtained.

Comparative Example 3

A polyethylene terephthalate sheet (trade name: "A-PET SHEET FR", manufactured by Teijin Ltd.), 1 mm in thickness and 200 mm in width, was supplied to a drawing apparatus (manufactured by Kyowa Engineering Co., Ltd.), and then preheated to 95° C. Thereafter, the sheet was subjected to pultrusion-drawing by pulling out the sheet at a speed of 2 m/min. from between a pair of rolls (roll clearance: 0.2 mm) heated to 100° C. and rotated at 0.05 m/min. in a draw direction. As a result, the polyethylene terephthalate sheet was broken immediately after the sheet passed between the rolls, and no pultrusion-drawn polyethylene terephthalate sheet was obtained.

Physical properties of the resultant oriented polyethylene terephthalate sheets were evaluated by evaluation methods described below, and the results are shown in Tables 1 and 2.

(1) Tensile Strength, Tensile Modulus

They were measured in accordance with the tensile test method of JIS K 7113.

(2) Heat Resistance

The resultant oriented polyethylene terephthalate sheets were each put on an iron plate heated to one out of predetermined temperatures shown in Table 2, and then heated for 3 minutes. The tensile strength and tensile modulus thereof were measured in accordance with the tensile test method of JIS K 7113.

TABLE 1

| | | Pultrusion-drawing temperature | | Uniaxial | | |
|---|---|---|---|---|---|---|
| | | Preheating temperature (° C.) | Roll temperature (° C.) | drawing temperature (° C.) | Tensile Strength (MPa) | Tensile Modulus (GPa) |
| Examples | 1 | 75 | 80 | 170 | 460 | 9.1 |
| | 2 | 75 | 80 | 130 | 357 | 10.2 |
| | 3 | 75 | 80 | 115 | 355 | 11.0 |
| | 4 | 75 | 80 | 170 | 480 | 11.4 |
| Comparative Examples | 1 | 75 | 80 | — | 310 | 11.3 |
| | 2 | 45 | 50 | — | — | — |
| | 3 | 95 | 100 | — | — | — |

TABLE 2

| Heating temperature (° C.) | Examples 1 | 2 | 3 | 4 | Comparative Example 1 |
|---|---|---|---|---|---|
| Tensile Modulus (GPa) 30 | 9.1 | 10.2 | 11.0 | 11.4 | 11.3 |
| 60 | — | — | 11.0 | — | 9.3 |
| 80 | — | 10.2 | 9.8 | — | 7.8 |
| 100 | — | 10.3 | 9.2 | 11.0 | 6.1 |
| 120 | — | 7.9 | 7.9 | — | 5.9 |
| 140 | 8.5 | 6.8 | 6.6 | 10.7 | — |
| 160 | 8.3 | 7.0 | — | 10.3 | — |
| 180 | 6.8 | — | — | 8.8 | — |
| 190 | 6.5 | — | — | 8.8 | — |
| 200 | 6.3 | — | — | 8.6 | — |

Example 5

A polyethylene terephthalate sheet (trade name: "A-PET SHEET FR", manufactured by Teijin Ltd., crystallinity: 4%), 1 mm in thickness and 200 mm in width, was supplied to a drawing apparatus (manufactured by Kyowa Engineering Co., Ltd.), and then preheated to 70° C. Thereafter, the sheet was subjected to pultrusion-drawing by pulling out the sheet at a speed of 2 m/min. from between a pair of rolls (roll clearance: 0.2 mm) heated to 65° C. and rotated at 0.05 m/min. in a draw direction. When the rolls were not rotated, the feeding speed of the sheet to the drawing apparatus was a speed of 0.4 m/min. Next, the polyethylene terephthalate sheet was supplied into a hot wind heating room, equipped with pinch rolls and set to 200° C. and having a line length of 10 m, at an inlet speed of 2.0 m/min., and was subjected to roll-drawing while the outlet speed was set to 2.5 m/min., so as to yield an oriented polyethylene terephthalate sheet wherein the draw ratio was about 6.

The glass transition temperature of the polyethylene terephthalate sheet was 72° C., and the rise-up temperature of the crystallization peak in its differential scanning calorie curve measured at a temperature-raising rate of 10° C./min. was about 118° C. The rise-up temperature of the melting peak thereof was about 230° C.

Example 6

The oriented polyethylene terephthalate sheet yielded in Example 5 was supplied into a hot wind heating room, equipped with pinch rolls and set to 200° C. and having a line length of 10 m, at an inlet speed of 2.5 m/min., and was subjected to heatset while the outlet speed was set to 2.75 m/min. In this way, a heatsetted oriented polyethylene terephthalate sheet was yielded. The length of the heatsetted oriented thermoplastic polyester resin sheet was one (1.00) time as long as that of the oriented thermoplastic polyester resin sheet before the heatset.

Example 7

The oriented polyethylene terephthalate sheet yielded in Example 5 was supplied into a hot wind heating room, equipped with pinch rolls and set to 90° C. and having a line length of 14 m, at an inlet speed of 2.75 m/min., and was annealed while the outlet speed was set to 2.7 m/min. Thus, an annealed oriented polyethylene terephthalate sheet was yielded. The length of the annealed oriented thermoplastic polyester resin sheet was 0.98 time as long as that of the oriented thermoplastic polyester resin sheet before the annealing.

Example 8

The heatsetted oriented polyethylene terephthalate sheet yielded in Example 6 was supplied into a hot wind heating room, equipped with pinch rolls and set to 90° C. and having a line length of 14 m, at an inlet speed of 2.75 m/min., and was annealed while the outlet speed was set to 2.7 m/min. Thus, an annealed oriented polyethylene terephthalate sheet was yielded. The length of the annealed oriented thermoplastic polyester resin sheet was 0.98 time as long as that of the oriented thermoplastic polyester resin sheet before the annealing.

The tensile modulus and the shrinkage ratio of each of the oriented polyethylene terephthalate sheets yielded in Examples 5 to 8 were evaluated by evaluation methods described below, and the results are shown in Tables 3 and 4.

(3) Tensile Modulus

The resultant oriented polyethylene terephthalate sheet, the heatsetted oriented polyethylene terephthalate sheet, the annealed oriented polyethylene terephthalate sheet, and the heatsetted and annealed oriented polyethylene terephthalate sheet were each heated at 80° C. for 24 hours or 1000 hours. Thereafter, the sheets were each measured in accordance with the tensile test method of JIS K 7113.

(4) Shrinkage Ratio

The length of each of the resultant oriented polyethylene terephthalate sheets, and the length of the oriented polyethylene terephthalate sheets heated at 80° C. for 24 hours or 1000 hours were measured. The shrinkage ratio thereof is shown in percentage to the oriented polyethylene terephthalate sheet before the heating.

TABLE 3

| | | Pultrusion-drawing temperature | | Uniaxial | | | |
|---|---|---|---|---|---|---|---|
| | | Preheating temperature (° C.) | Roll temperature (° C.) | drawing temperature (° C.) | Heatsetting temperature (° C.) | Annealing temperature (° C.) | Tensile Modulus (GPa) |
| Examples | 5 | 70 | 65 | 200 | — | — | 10.7 |
| | 6 | 70 | 65 | 200 | 200 | — | 11.4 |
| | 7 | 70 | 65 | 200 | — | 90 | 9.0 |
| | 8 | 70 | 65 | 200 | 200 | 90 | 9.4 |

TABLE 4

| | | Tensile Modulus (GPa) | | Shrinkage Ratio (%) | |
|---|---|---|---|---|---|
| | Initial | After 24 hours at 80° C. | After 1000 hours at 80° C. | After 24 hours at 80° C. | After 1000 hours at 80° C. |
| Examples 5 | 10.7 | 10.1 | 9.1 | 1.5 | 2.1 |
| 6 | 11.4 | 9.8 | 9.8 | 1.0 | 1.2 |
| 7 | 9.0 | 8.7 | 8.5 | 0.05 | 0.4 |
| 8 | 9.4 | 9.1 | 9.0 | 0.03 | 0.05 |

Example 9

A polyethylene terephthalate sheet (article number: "NEH2070", manufactured by Unitika, Ltd., intrinsic viscosity: 0.88) was melt-extruded, and then cooled rapidly to yield a sheet having a crystallinity of 1.3%, a thickness of 3 mm, and a width of 200 mm. The resultant sheet was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.6 mm) heated to 80° C. and rotated at 0.05 m/min. in a draw direction. Furthermore, the sheet was heated in a hot wind heating room to set the polyethylene terephthalate sheet surface temperature to 200° C., and was subjected to roll-drawing while the outlet speed was set to 2.5 m/min., so as to yield an oriented polyethylene terephthalate sheet wherein the draw ratio was about 5.7. When the rolls were not rotated, the feeding speed of the sheet to the drawing apparatus was a speed of 0.4 m/min.

The glass transition temperature of the polyethylene terephthalate sheet was 76.7° C., and the rise-up temperature of the crystallization peak in its differential scanning calorie curve measured at a temperature-raising rate of 10° C./min. was 139.8° C. The rise-up temperature of the melting peak thereof was 234° C.

Example 10

A polyethylene terephthalate sheet (article number: "NEH2070", manufactured by Unitika, Ltd., intrinsic viscosity: 0.88) was melt-extruded, and then cooled rapidly to yield a sheet having a crystallinity of 1.3%, a thickness of 3 mm, and a width of 200 mm. The resultant sheet was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.6 mm) heated to 80° C. and rotated at 0.2 m/min. in a draw direction. Furthermore, the sheet was heated in a hot wind heating room to set the polyethylene terephthalate sheet surface temperature to 200° C., and was subjected to roll-drawing while the outlet speed was set to 2.5 m/min., so as to yield an oriented polyethylene terephthalate sheet wherein the draw ratio was 5.7.

Example 11

A polyethylene terephthalate sheet (article number: "NEH2070", manufactured by Unitika, Ltd., intrinsic viscosity: 0.88) was melt-extruded, and then cooled rapidly to yield a sheet having a crystallinity of 1.3%, a thickness of 3 mm, and a width of 200 mm. The resultant sheet was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.6 mm) heated to 80° C. and rotated at 0.4 m/min. in a draw direction. Furthermore, the sheet was heated in a hot wind heating room to set the polyethylene terephthalate sheet surface temperature to 200° C., and was subjected to roll-drawing while the outlet speed was set to 2.5 m/min., so as to yield an oriented polyethylene terephthalate sheet wherein the draw ratio was 5.7.

Comparative Example 4

A polyethylene terephthalate sheet (article number: "NEH2070", manufactured by Unitika, Ltd., intrinsic viscosity: 0.88) was melt-extruded, and then cooled rapidly to yield a sheet having a crystallinity of 1.3%, a thickness of 3 mm, and a width of 200 mm. The resultant sheet was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.6 mm) heated to 80° C. and rotated at 0.5 m/min. in a draw direction. Furthermore, the sheet was heated in a hot wind heating room to set the polyethylene terephthalate sheet surface temperature to 200° C., and was subjected to roll-drawing while the outlet speed was set to 2.5 m/min., so as to yield an oriented polyethylene terephthalate sheet wherein the draw ratio was 5.1.

Comparative Example 5

A polyethylene terephthalate sheet (article number: "NEH2070", manufactured by Unitika, Ltd., intrinsic viscosity: 0.88) was melt-extruded, and then cooled rapidly to yield a sheet having a crystallinity of 1.3%, a thickness of 3 mm, and a width of 200 mm. The resultant sheet was supplied to a drawing apparatus (manufactured by Kyowa Engineering Co., Ltd.), and then preheated to 75° C. Thereafter, the sheet was subjected to pultrusion-drawing by pulling out the sheet at a speed of 2 m/min. from between a pair of rolls (roll clearance: 0.6 mm) heated to 80° C. and rotated at 0.6 m/min. in a draw direction. Furthermore, the sheet was heated in a hot wind heating room to set the polyethylene terephthalate sheet surface temperature to 200° C., and was subjected to roll-drawing while the outlet speed was set to 2.5 m/min., so as to yield an oriented polyethylene terephthalate sheet wherein the draw ratio was 3.6.

Physical properties of the resultant polyethylene terephthalate sheets after the pultrusion-drawing and after the uniaxial drawing were evaluated by evaluation methods described below. The results are shown in Table 5.

(1) Tensile Strength, Tensile Modulus

They were measured in accordance with the tensile test method of JIS K 7113.

TABLE 5

| | Roll rotating speed (m/min) | After the pultrusion-drawing | | After the uniaxial drawing | |
|---|---|---|---|---|---|
| | | Draw ratio (—) | Tensile Modulus (GPa) | Draw ratio (—) | Tensile Modulus (GPa) |
| Examples 9 | 0.05 | 5.1 | 8.3 | 5.7 | 8.5 |
| 10 | 0.2 | 5.1 | 9.1 | 5.7 | 9.3 |
| 11 | 0.4 | 5.1 | 10.5 | 5.7 | 10.5 |
| Comparative 4 | 0.5 | 4.5 | 8.2 | 5.1 | 8.4 |
| Examples 5 | 0.6 | 3.2 | 7.4 | 3.6 | 7.5 |

Example 12

Polyethylene terephthalate sheets (trade name: "A-PET SHEET FR", manufactured by Teijin Ltd., intrinsic viscosity: 0.7, crystallinity: 4%), 1 mm in thickness and 200 mm in width, were each supplied to a drawing apparatus (manufactured by Kyowa Engineering Co., Ltd.), and then preheated to 75° C. Thereafter, each of the sheets was subjected to pultrusion-drawing by pulling out the sheet at a speed of 2 m/min. from between a pair of rolls (roll clearance: 0.2 mm) heated to 70° C. and rotated at 0.05 m/min. in a draw direction, and further the sheet was heated in a hot wind heating room to set the polyethylene terephthalate sheet surface temperature to 180° C., and was subjected to roll-drawing while the outlet speed was set to 2.5 m/min. In this way, oriented polyethylene terephthalate sheets wherein the draw ratio was about 5 were yielded. When the rolls were not rotated, the feeding speed of the sheets to the drawing apparatus was a speed of 0.4 m/min.

The glass transition temperature of the polyethylene terephthalate sheets was 72° C., and the rise-up temperature of the crystallization peak in their differential scanning calorie curve measured at a temperature-raising rate of 10° C./min. was about 118° C. The rise-up temperature of the melting peak thereof was about 230° C.

A polyester type hot melt adhesive (trade name: "Vylon GM-920", manufactured by Toyobo Co., Ltd., melting point: 107° C.) was applied to each of the surfaces of each of the resultant oriented polyethylene terephthalate sheets by melt-extrusion coating, so as to give a thickness of 0.03 mm. In this way, adhesive-laminated oriented polyethylene terephthalate sheets were yielded.

An oriented polyethylene terephthalate sheet on which no adhesive was laminated was sandwiched between the resultant adhesive-laminated oriented polyethylene terephthalate sheets, the number of which was two, in such a manner that their draw directions were made consistent with each other. The resultant was passed through a hot roll press of 150° C. to yield a polyethylene terephthalate laminate wherein the hot melt adhesive was laminated onto each of its two surfaces.

A vinyl chloride resin (article number: "TS1000R", manufactured by Tokuyama Sekisui Co., Ltd.) was applied to each of the surfaces of the resultant polyethylene terephthalate laminate at 200° C. by extrusion coating, so as to yield a laminate-molded body wherein the vinyl chloride resin was laminated on each of the surfaces of the polyethylene terephthalate laminate.

Example 13

A polyethylene terephthalate (trade name: "NEH-2070", manufactured by Unitika, Ltd., intrinsic viscosity: 0.88) was melt-extruded, and then cooled rapidly. The yielded polyethylene terephthalate sheet having a crystallinity of 1.3%, a thickness of 2.5 mm, and a width of 200 mm was supplied to a drawing apparatus (manufactured by Kyowa Engineering Co., Ltd.), and then preheated to 80° C. Thereafter, the sheet was pulled out at a speed of 2 m/min. from between a pair of rolls (roll clearance: 0.6 mm) heated to 74° C. and rotated at 0.05 m/min. in a draw direction. Furthermore, the sheet was heated in a hot wind heating room to set the polyethylene terephthalate sheet surface temperature to 180° C., and was subjected to roll-drawing while the outlet speed was set to 2.5 m/min., so as to yield an oriented polyethylene terephthalate sheet wherein the draw ratio was about 5. The feeding speed of the sheet to the drawing apparatus was a speed of 0.4 m/min.

The glass transition temperature of the polyethylene terephthalate sheet was 76.7° C., and the rise-up temperature of the crystallization peak in its differential scanning calorie curve measured at a temperature-raising rate of 10° C./min. was 139.8° C. The rise-up temperature of the melting peak thereof was 234° C.

A polyester type hot melt adhesive (trade name: "Vylon GM-920", manufactured by Toyobo Co., Ltd., melting point: 107° C.) was applied to each of the surfaces of the resultant oriented polyethylene terephthalate sheet by melt-extrusion coating, so as to give a thickness of 0.03 mm. In this way, an adhesive-laminated oriented polyethylene terephthalate sheet was yielded.

A vinyl chloride resin (article number: "TS1000R", manufactured by Tokuyama Sekisui Co., Ltd.) was applied to each of the surfaces of the resultant adhesive-laminated oriented polyethylene terephthalate sheet at 200° C. by extrusion coating, so as to yield a laminate-molded body wherein the vinyl chloride resin was laminated on each of the surfaces of the polyethylene terephthalate laminate.

Comparative Example 6

A vinyl chloride resin (article number: "TS1000R", manufactured by Tokuyama Sekisui Co., Ltd.) was extruded at 200° C. to yield a vinyl chloride resin molded body having a thickness of 1.6 mm.

Example 14

A polyester type hot melt adhesive (trade name: "Vylon GM-920", manufactured by Toyobo Co., Ltd., melting point: 107° C.) was applied to one surface of each of oriented polyethylene terephthalate sheets yielded in Example 10 by melt-extrusion coating, so as to give a thickness of 0.03 mm. In this way, adhesive-laminated oriented polyethylene terephthalate sheets were yielded.

An oriented polyethylene terephthalate sheet on which no adhesive was laminated was sandwiched between the resultant adhesive-laminated polyethylene terephthalate sheets, the number of which was two, in such a manner that an adhesive layer was interposed therebetween and their draw directions were made consistent with each other. The resultant was then passed through a hot roll press of 150° C. to yield an oriented polyethylene terephthalate laminate.

Physical properties of the oriented polyethylene terephthalate sheets and the laminate-molded bodies (the vinyl chloride resin molded body and the oriented polyethylene terephthalate laminate) yielded in Examples 12 to 14 and Comparative Example 6 were evaluated by evaluation methods described below. The results are shown in Table 6.

(5) Linear Expansion Coefficient

The resultant oriented polyethylene terephthalate sheets were measured in accordance with JIS K 7197.

(6) Thickness of Each Layer, and the Number of the Layers

A cross section of each of the resultant laminate-molded bodies was observed with a microscope. The following were then measured: the thickness of the laminate-molded bodies, the layer number and the thickness of the oriented polyethylene terephthalate sheet(s) and those of the hot melt adhesive, and the thickness of the vinyl chloride resin layer(s).

(7) Thermal Elongation

The resultant laminate-molded bodies were each cut into a length of 5 m, and the cut piece was immersed in a water tank of 75° C. for 2 hours. Thereafter, the piece was allowed to stand still at 20° C. for 12 hours, and the length (a) of the laminate-molded body was measured. The laminate-molded body was again immersed in a water tank of 75° C. for 2 hours, and then the length (b) of the laminate-molded body was measured. The thermal elongation is represented by the value of "length (b)−length (a)".

(8) Falling Ball Impact Test

The resultant laminate-molded bodies were each cut out into a test piece of 75 mm×75 mm. Toward the center thereof, an iron ball of 1 kg in weight was fallen from a position of 1.3 m in height. It was then observed whether or not a crack or a fissure was generated therein. The measurement temperature was 0° C.

(9) Tensile Modulus

In accordance with the tensile test method of JIS K 7113, the tensile modulus in the draw direction or the extrusion direction was measured.

(10) Charpy Impact Value

The resultant laminate-molded bodies were each cut out into a piece of 80 mm in length and 10 mm in width (the width direction was equal to the draw direction of the oriented polyethylene terephthalate sheet). A V-shaped notch (depth: 2 mm) was made therein, and the Charpy impact value was measured in accordance with JIS K 7111.

A polyester type hot melt adhesive (trade name: "Vylon GM-920", manufactured by Toyobo Co., Ltd.) was applied to each of the surfaces of the oriented polyethylene terephthalate sheet yielded in Example 1, so as to give a thickness of 0.03 mm. Thereafter, a vinyl chloride resin sheet (a sheet obtained by extruding an article manufactured by Tokuyama Sekisui Co., Ltd. and having an article number of "TS1000R") 0.25 mm in thickness was laminated onto each of the surfaces, and the resultant was hot-pressed at 160° C. and a pressure of 1 MPa for 180 seconds to yield a laminate-molded body wherein the vinyl chloride resin sheet was laminated onto each of the surfaces of the oriented polyethylene terephthalate sheet. The linear expansion coefficient of the resultant laminate-molded body was measured in the same way as in Example 9. As a result, it was $1.8 \times 10^{-5}/°$ C.

Example 16

A polyethylene terephthalate (trade name: "NEH-2070", manufactured by Unitika, Ltd., intrinsic viscosity: 0.88) was melt-extruded, and then cooled rapidly. The yielded polyethylene terephthalate sheet having a crystallinity of 1.3%, a thickness of 2.5 mm, and a width of 200 mm was supplied to a drawing apparatus (manufactured by Kyowa Engineering Co., Ltd.), and then preheated to 80° C. Thereafter, the sheet was pulled out at a speed of 2 m/min. from between a pair of rolls (roll clearance: 0.6 mm) heated to 74° C. and rotated at 0.05 m/min. in a draw direction. Furthermore, the sheet was heated in a hot wind heating room to set the polyethylene terephthalate sheet surface temperature to 180° C., and was subjected to roll-drawing while the outlet speed was set to 2.5 m/min., so as to yield an oriented polyethylene terephthalate sheet wherein the draw ratio was about 5. The feeding speed of the sheet to the drawing apparatus was a speed of 0.4 m/min.

The glass transition temperature of the polyethylene terephthalate sheet was 76.7° C., and the rise-up temperature of the crystallization peak in its differential scanning calorie

TABLE 6

| | | | Example 12 | Example 13 | Comparative Example 6 | Example 14 |
|---|---|---|---|---|---|---|
| Oriented polyethylene terephthalate sheet | Linear Expansion Coefficient | $\times 10^{-5}/°$ C. | −0.7 | −0.6 | — | −0.6 |
| | Tensile Modulus | GPa | 13 | 13 | — | 9 |
| | Thickness | mm | 0.2 | 0.5 | — | 0.5 |
| | Layer number | — | 3 | 1 | — | 3 |
| Hot melt adhesive layer | Thickness | mm | 0.03 | 0.03 | — | 0.03 |
| | Layer number | — | 4 | 2 | — | 2 |
| Vinyl chloride resin layer | Thickness | mm | 0.4 | 0.45 | 1.6 | — |
| | Layer number | — | 2 | 2 | 1 | — |
| Thickness of laminate-molded body | | mm | 1.52 | 1.46 | 1.6 | 1.56 |
| Thermal Elongation | | mm/5 m | 3.3 | 4.8 | 19.0 | −1.5 |
| Falling Ball Impact Test | | Crack or fissure | None | None | None | Fissure |
| Tensile Modulus | | GPa | 5.8 | 5.5 | 2.7 | 11.0 |
| Charpy Impact Value | | kJ/m$^2$ | 2.5 | 2.4 | — | — |

Example 15

The linear expansion coefficient of the oriented polyethylene terephthalate sheet yielded in Example 1 was measured in the same way as in Example 9. As a result, the linear expansion coefficient was $-0.6 \times 10^{-5}/°$ C.

curve measured at a temperature-raising rate of 10° C./min. was 139.8° C. The rise-up temperature of the melting peak thereof was 234° C.

A polyester type hot melt adhesive (trade name: "Vylon GM-920", manufactured by Toyobo Co., Ltd., melting point: 107° C.) was applied to each of the surfaces of the resultant oriented polyethylene terephthalate sheet by melt-extrusion coating, so as to give a thickness of 0.03 mm. In this way, an adhesive-laminated oriented polyethylene terephthalate sheet was yielded.

The resultant adhesive-laminated oriented polyethylene terephthalate sheet was bending-molded to form a molded body in the form of a gutter having a "U-shaped" section and having a base length of 120 mm and a side wall height of 90 mm. A vinyl chloride resin (article number: "TS10000R", manufactured by Tokuyama Sekisui Co., Ltd.) was applied to each of the surfaces of the body by extrusion coating at 200° C., so as to yield a laminate-molded body wherein a vinyl chloride resin layer 0.5 mm in thickness was laminated onto each of the surfaces of the polyethylene terephthalate laminate.

Comparative Example 7

A laminate-molded body was yielded in the same way as in Example 16 except that the roll clearance and the draw ratio were set to 1.1 mm and 2, respectively.

Comparative Example 8

A laminate-molded body was yielded in the same way as in Example 16 except that the roll clearance, the pulling-out speed, the outlet temperature of the hot wind heating room and the draw ratio were 0.1 mm, 4 m/min., 5 m/min., and 10, respectively.

Physical properties of the laminate-molded bodies yielded in Example 16 and Comparative Examples 7 and 8 were evaluated by evaluation methods described below. The results are shown in Table 7.

(11) Liner Expansion Coefficient

The resultant laminate-molded bodies were measured in accordance with JIS K 7197.

(12) Falling Ball Impact Test

The resultant gutter-form laminate-molded bodies were each cut out into a length of 4 m. The resultant piece was cured in a refrigerating room of 0° C. for one hour. The piece was set up to direct the opening thereof downward. An eggplant-shaped weight of 1 kg was fallen thereon from a position of 1.3 m in height. It was then observed whether or not the product was cracked.

(13) Scissors Breaking Test

The resultant laminate-molded bodies were each cut with scissors along the length direction (draw direction) thereof and along the perpendicular direction (width direction) thereof.

It was then observed whether or not a breaking or a crack was generated.

TABLE 7

|  |  | Example 16 | Comparative Example 7 | Comparative Example 8 |
|---|---|---|---|---|
| Linear Expansion Coefficient ($\times 10^{-5}$/° C.) | | 1.5 | 4.0 | 1.0 |
| Falling Ball Impact Test | | Not broken | Not broken | Broken |
| Scissors Breaking Test | Draw direction | Not broken | Not broken | Cracked |
|  | Width direction | Not broken | Not broken | Not broken |

Example 17

A polyethylene terephthalate (trade name: "NEH-2070", manufactured by Unitika, Ltd., intrinsic viscosity: 0.88) was melt-extruded, and then cooled rapidly. The yielded polyethylene terephthalate sheet having a crystallinity of 1.3%, a thickness of 2.5 mm, and a width of 200 mm was supplied to a drawing apparatus (manufactured by Kyowa Engineering Co., Ltd.), and then preheated to 80° C. Thereafter, the sheet was subjected to pultrusion-drawing by pulling out the sheet at a speed of 2 m/min. from between a pair of rolls (roll clearance: 0.2 mm) heated to 74° C. and rotated at 0.05 m/min. in a draw direction. Furthermore, the sheet was heated in a hot wind heating room to set the polyethylene terephthalate sheet surface temperature to 180° C., and was subjected to roll-drawing while the outlet speed was set to 2.5 m/min., so as to yield an oriented polyethylene terephthalate sheet wherein the draw ratio was about 5.

The glass transition temperature of the polyethylene terephthalate sheet was 76.7° C., and the rise-up temperature of the crystallization peak in its differential scanning calorie curve measured at a temperature-raising rate of 10° C./min. was 139.8° C. The rise-up temperature of the melting peak thereof was 234° C. The feeding speed of the sheet to the drawing apparatus was a speed of 0.4 m/min.

A polyester type hot melt adhesive (trade name: "Vylon GM-920", manufactured by Toyobo Co., Ltd., melting point: 107° C.) was applied to each of the surfaces of the resultant oriented polyethylene terephthalate sheet by melt-extrusion coating, so as to give a thickness of 0.03 mm. In this way, an adhesive-laminated oriented polyethylene terephthalate sheet was yielded.

A polyester long fiber nonwoven cloth (trade name "Ecule 3301A", manufactured by Toyobo Co., Ltd., weight per unit area: 30 g/m$^2$, thickness: 0.2 mm) was laminated onto each of the surfaces of the resultant adhesive-laminated oriented polyethylene terephthalate sheet, and then the laminate was pressed by means of hot rolls of 140° C. Thereafter, a vinyl chloride resin (article number: "TS1000R", manufactured by Tokuyama Sekisui Co., Ltd.) was applied onto each of the surfaces of the laminate by extrusion-coating at 200° C. to yield a laminate-molded body wherein a vinyl chloride resin layer 0.5 mm in thickness was laminated on each of the surfaces of the polyethylene terephthalate laminate.

The resultant laminate-molded body was cut out into a piece of 80 mm in length and 10 mm in width (the width direction was equal to the draw direction of the oriented polyethylene terephthalate sheet). A V-shaped notch (depth: 2 mm) was made therein, and the Charpy impact value was measured in accordance with JIS K 7111. As a result, it was 3.9 kJ/m$^2$.

Example 18

A polyester long fiber nonwoven cloth (trade name "Ecule 3301A", manufactured by Toyobo Co., Ltd., weight per unit area: 30 g/m$^2$, thickness: 0.3 mm) was interposed between the two adhesive-laminated oriented polyethylene terephthalate sheets yielded in Example 12, and then the laminate was pressed by means of hot rolls of 150° C. Thereafter, a vinyl chloride resin (article number: "TS1000R", manufactured by Tokuyama Sekisui Co., Ltd.) was applied onto each of the surfaces of the laminate by extrusion-coating at 200° C. to yield a laminate-molded body wherein a vinyl chloride resin layer 0.5 mm in thickness was laminated on each of the surfaces of the polyethylene terephthalate laminate. The two adhesive-laminated oriented polyethylene terephthalate sheets were laminated to make the draw directions thereof consistent with each other.

The resultant laminate-molded body was cut out into a piece of 80 mm in length and 10 mm in width (the width direction was equal to the draw direction of the oriented polyethylene terephthalate sheet). A V-shaped notch (depth: 2 mm) was made therein, and the Charpy impact value was measured in accordance with JIS K 7111. As a result, it was 4.0 kJ/m$^2$.

Example 19

A polyester type hot melt adhesive (trade name: "Vylon GM-920", manufactured by Toyobo Co., Ltd., melting point: 107° C.) was applied to a single surface of a polyester long fiber nonwoven cloth (trade name "Ecule 3301A", manufactured by Toyobo Co., Ltd., weight per unit area: 30 g/m$^2$, thickness: 0.2 mm) in an amount of 140 g per m$^2$ by melt-extrusion coating. Before the hot melt adhesive was solidified, the resultant was passed between a pair of silicon rubber rolls to yield a polyester type hot melt adhesive impregnated polyester long fiber nonwoven cloth.

The resultant polyester type hot melt adhesive impregnated polyester long fiber nonwoven cloth was laminated onto each of the surfaces of the oriented polyethylene terephthalate sheet yielded in Example 10, and the laminate was supplied to a mold, so as to apply a vinyl chloride resin (article number: "TS1000R", manufactured by Tokuyama Sekisui Co., Ltd.) to each of the surfaces of the laminate by extrusion-coating at 200° C., thereby yielding a laminate-molded body wherein the polyester type hot melt adhesive impregnated polyester long fiber nonwoven cloth and a vinyl chloride resin layer 0.5 mm in thickness were laminated on each of the surfaces of the polyethylene terephthalate laminate.

The resultant laminate-molded body was cut out into a piece of 80 mm in length and 10 mm in width (the width direction was equal to the draw direction of the oriented polyethylene terephthalate sheet). A V-shaped notch (depth: 2 mm) was made therein, and the Charpy impact value was measured in accordance with JIS K 7111. As a result, it was 4.0 kJ/m$^2$.

Example 20

A polyethylene terephthalate (trade name: "NEH-2070", manufactured by Unitika, Ltd., intrinsic viscosity: 0.88) was melt-extruded, and then cooled rapidly. The yielded polyethylene terephthalate sheet having a crystallinity of 1.3%, a thickness of 2.5 mm, and a width of 200 mm was supplied to a drawing apparatus (manufactured by Kyowa Engineering Co., Ltd.), and then preheated to 80° C. Thereafter, the sheet was pulled out at a speed of 2 m/min. from between a pair of rolls (roll clearance: 0.6 mm) heated to 74° C. Furthermore, the sheet was heated in a hot wind heating room to set the polyethylene terephthalate sheet surface temperature to 180° C., and was subjected to roll-drawing while the outlet speed was set to 2.5 m/min., so as to yield an oriented polyethylene terephthalate sheet wherein the draw ratio was about 5.

The glass transition temperature of the polyethylene terephthalate sheet was 76.7° C., and the rise-up temperature of the crystallization peak in its differential scanning calorie curve measured at a temperature-raising rate of 10° C./min. was 139.8° C. The rise-up temperature of the melting peak thereof was 234° C. The feeding speed of the sheet to the drawing apparatus was a speed of 0.4 m/min.

Figure 2:
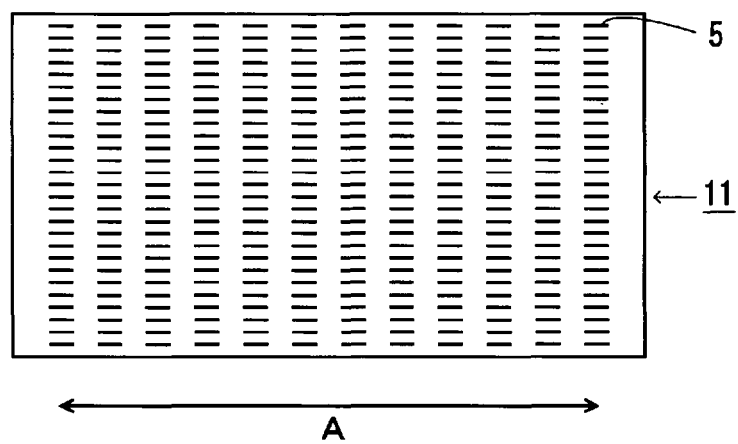
FIG. 2 It is an explanatory view illustrating an example of an arrangement pattern of melt-bonded moieties of a laminate-molded body.
Figure 3:
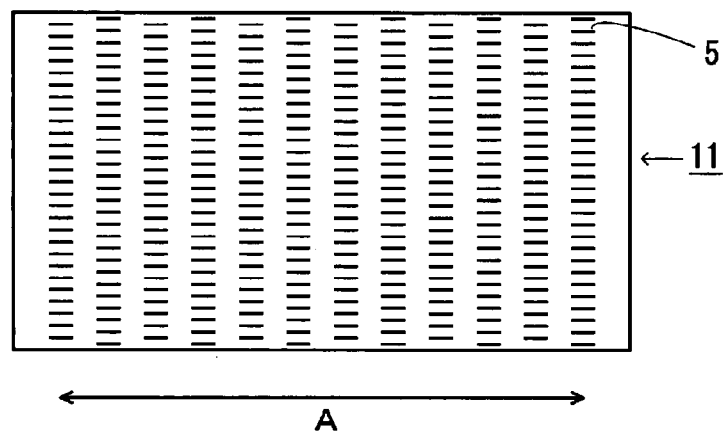
FIG. 3 It is an explanatory view illustrating a different example of the arrangement pattern of the melt-bonded moieties of the laminate-molded body.
Figure 4:
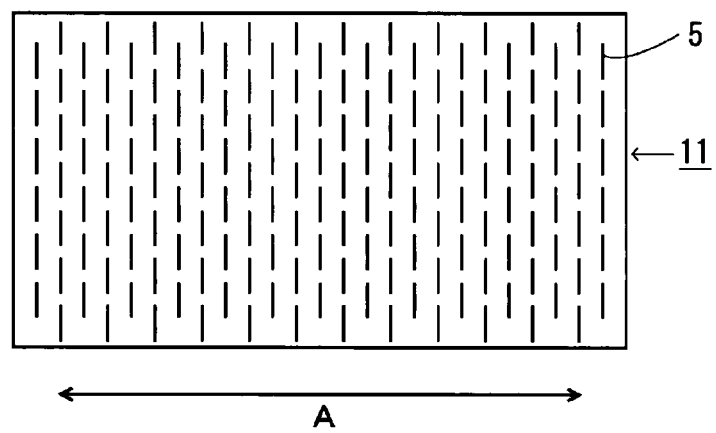
FIG. 4 It is an explanatory view illustrating a different example of the arrangement pattern of the melt-bonded moieties of the laminate-molded body.
Figure 5:
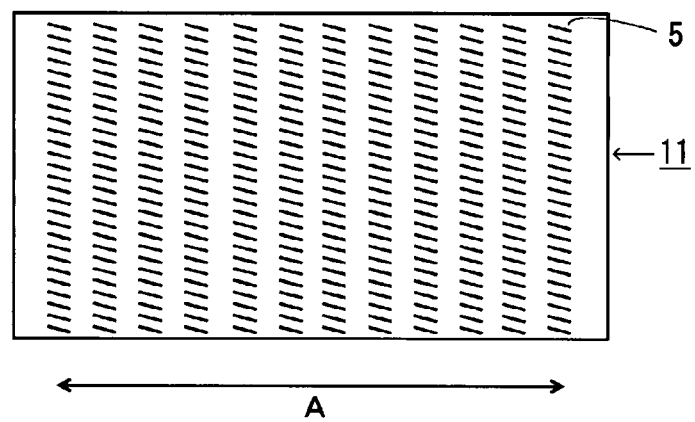
FIG. 5 It is an explanatory view illustrating a different example of the arrangement pattern of the melt-bonded moieties of the laminate-molded body.
Figure 6:
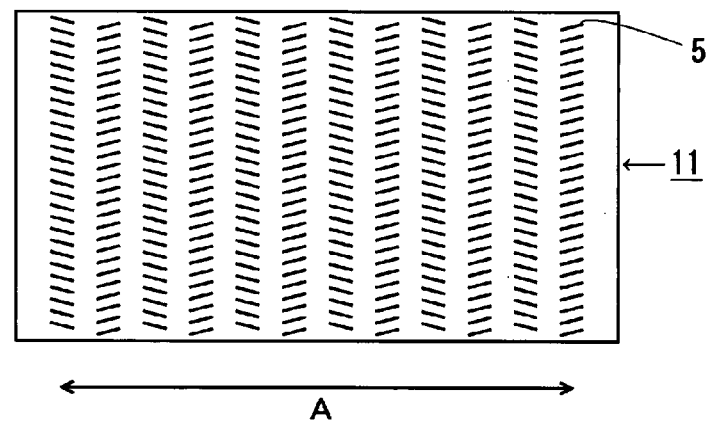
FIG. 6 It is an explanatory view illustrating a different example of the arrangement pattern of the melt-bonded moieties of the laminate-molded body.

A laminate wherein a polyester long fiber nonwoven cloth (trade name "Ecule 3701A", manufactured by Toyobo Co., Ltd., weight per unit area: 70 g/m$^2$, thickness: 0.31 mm, melting point: about 230° C.) was laminated on each of the surfaces of the resultant oriented polyethylene terephthalate sheet was supplied to an ultrasonic welder (trade name: "SONOPET Σ-1200", manufactured by Seidensha Electronics Co., Ltd.). The laminate was then passed at a speed of 2 m/min. from between its horn and knurling tool in which the clearance was 0.2 mm and the pressure was 0.8 MPa to melt-bond the nonwoven cloth to the sheet by means of the ultrasonic welder. The pattern of the melt-bonded moieties is as shown in FIG. 2. About the size of each of the melt-bonded moieties, the length was about 1.5 mm and the width was about 0.5 mm in the draw direction. The interval between the melt-bonded moieties was about 1.5 mm, and the width therebetween was about 1.5 mm in the draw direction.

A vinyl chloride resin (article number: "TS1000R", manufactured by Tokuyama Sekisui Co., Ltd.) was applied to each of the surfaces of the resultant oriented polyethylene terephthalate sheet, wherein the polyester long fiber nonwoven cloth was melt-bonded to each of the surfaces, by extrusion-coating at 200° C., so as to impregnate the polyester long fiber nonwoven cloth with the vinyl chloride resin, thereby yielding a laminate-molded body wherein a vinyl chloride resin sheet 0.5 mm in thickness was laminated on each of the surfaces of the polyethylene terephthalate laminate. The linear expansion coefficient of the resultant laminate-molded body was measured in accordance with JIS K 7197. As a result, it was 1.5×10$^{-5}$ (1/° C.).

The resultant laminate-molded body was cut out into a test piece of 75 mm×75 mm. Toward the center thereof, an iron ball of 1 kg in weight was fallen from a position of 1.3 m in height in a temperature-controlled room of 0° C. It was then observed whether or not a crack or a fissure was generated therein. As a result, neither crack nor fissure was generated. The resultant laminate-molded body was cut out into a piece of 80 mm in length and 10 mm in width (the width direction was equal to the draw direction of the oriented polyethylene terephthalate sheet). A V-shaped notch (depth: 2 mm) was made therein, and the Charpy impact value was measured in accordance with JIS K-7111. As a result, the Charpy impact value was 5.2 kJ/m$^2$. When the test piece after the measurement was observed with the naked eye, on peeling of the thermoplastic resin sheet was observed. Thus, it was found that the sheet was firmly bonded.

Example 21

A laminate wherein a polyester long fiber nonwoven cloth (trade name "Volans 4061N", manufactured by Toyobo Co., Ltd., weight per unit area: 70 g/m$^2$, melting point: about 230° C.) treated with a needle punch was laminated on each of the surfaces of the oriented polyethylene terephthalate sheet yielded in Example 20 was supplied to an ultrasonic welder (trade name: "SONOPET Σ-1200", manufactured by Seidensha Electronics Co., Ltd.). While its horn was pushed against the laminate on its knurling tool at a load of 15 N/mm in the width direction, the laminate was passed therebetween at a speed of 2 m/min, so as to melt-bond the nonwoven cloth to the sheet by means of the ultrasonic welder. The pattern of the melt-bonded moieties is as shown in FIG. 2. About the size of each of the melt-bonded moieties, the length was about 1.5 mm and the width was about 0.5 mm in the draw direction. The interval between the melt-bonded moieties was about 1.5 mm, and the width therebetween was about 1.5 mm in the draw direction.

A vinyl chloride resin (article number: "TS1000R", manufactured by Tokuyama Sekisui Co., Ltd.) was applied to each of the surfaces of the resultant oriented polyethylene terephthalate sheet, wherein the polyester long fiber nonwoven cloth was melt-bonded to each of the surfaces, by extrusion-coating at 200° C., so as to impregnate the polyester long fiber nonwoven cloth with the vinyl chloride resin, thereby yielding a laminate-molded body wherein a vinyl chloride resin sheet 0.5 mm in thickness was laminated on each of the surfaces of the polyethylene terephthalate laminate.

Linear expansion coefficient (in accordance with JIS K 7197): $1.3 \times 10^{-5}/°C$.

Tensile modulus (in accordance with JIS K 7113, in the draw direction): 5.8 GPa

Peel strength of bonded (in accordance with JIS K 6854, T-peel test, a test piece was formed in a state that the nonwoven cloth melt-bonded oriented polyethylene terephthalate sheet was regarded as an adhesive layer): 2.7 N/mm Example 22

The same way as in Example 21 was carried out except that a polyester long fiber nonwoven cloth (article name: "7860A", manufactured by Shinwa Corp., weight per unit area: 60 g/m², melting point: about 230° C.), which was produced by a spun-lacing method (a water flow confounding method), was applied to each of the surfaces of the oriented polyethylene terephthalate sheet yielded in Example 20.

Linear expansion coefficient (in accordance with JIS K 7197): $1.3 \times 10^{-5}/°C$.

Tensile modulus (in accordance with JIS K 7113, in the draw direction): 5.9 GPa

Peel strength of bonded (in accordance with JIS K 6854, T-peel test, a test piece was formed in a state that the nonwoven cloth melt-bonded oriented polyethylene terephthalate sheet was regarded as an adhesive layer): 2.5 N/mm Example 23

The same way as in Example 21 was carried out except that a polyester long fiber nonwoven cloth (trade name "Ecule 3501A", manufactured by Toyobo Co., Ltd., weight per unit area: 50 g/m², melting point: about 230° C.), which was produced by a spun-bonding method, was applied to each of the surfaces of the oriented polyethylene terephthalate sheet yielded in Example 20.

Linear expansion coefficient (in accordance with JIS K 7197): $1.5 \times 10^{-5}/°C$.

Tensile modulus (in accordance with JIS K 7113, in the draw direction): 5.6 GPa

Peel strength of bonded (in accordance with JIS K 6854, T-peel test, a test piece was formed in a state that the nonwoven cloth melt-bonded oriented polyethylene terephthalate sheet was regarded as an adhesive layer): 1.7 N/mm

INDUSTRIAL APPLICABILITY

The oriented thermoplastic polyester resin sheet of the present invention is excellent in tensile strength, tensile modulus, and heat resistance. A laminate-molded body wherein a thermoplastic resin is laminated on each of the surfaces of the sheet has a low linear expansion coefficient, and is light and excellent in impact resistance, durability, easiness of handling, productivity, and others. Accordingly, the laminate-molded body can be used suitably as an exterior building member such as a gutter.

The invention claimed is:

1. A process for producing an oriented thermoplastic polyester resin sheet, which comprises: pultrusion-drawing a thermoplastic polyester resin sheet in an amorphous state at a temperature from the glass transition temperature of the thermoplastic polyester resin −20° C. to the glass transition temperature of the thermoplastic polyester resin +20° C.; and then drawing the resultant uniaxially at a temperature higher than the temperature for the pultrusion-drawing and at a temperature from the rise-up temperature of the crystallization peak of the thermoplastic polyester resin in its differential scanning calorie curve measured at a temperature-raising rate of 10° C./min. to the rise-up temperature of the melting peak thereof in the curve, wherein the pultrusion-drawing is a drawing process involving pultrusion-drawing the thermoplastic polyester resin sheet between a pair of rolls having a clearance narrower than the thickness of the thermoplastic polyester resin sheet, heated to a temperature from the glass transition temperature of the thermoplastic polyester resin −20° C. to the glass transition temperature of the thermoplastic polyester resin +20° C., and rotated in the direction of pulling at a speed equal to or slower than the sheet-feeding speed when the thermoplastic polyester resin sheet is pulled at a pulling speed under the same condition in a state where the rolls are not rotated.

2. The process for producing an oriented thermoplastic polyester resin sheet according to claim 1, wherein the crystallinity of the thermoplastic polyester resin sheet in an amorphous state is less than 10%, the crystallinity being measured with a differential scanning calorimeter.

3. The process for producing an oriented thermoplastic polyester resin sheet according to claim 1, wherein the oriented thermoplastic polyester resin sheet undergoing the uniaxial drawing is heatsetted at a temperature from the rise-up temperature of the crystallization peak of the thermoplastic polyester resin in its differential scanning calorie curve measured at a temperature-raising rate of 10° C./min. to the rise-up temperature of the melting peak thereof in the curve, and that is a temperature not higher than the uniaxial drawing temperature by 30° C. or more.

4. The process for producing an oriented thermoplastic polyester resin sheet according to claim 3, wherein the heatset is performed in a state that the length of the oriented thermoplastic polyester resin sheet undergoing the uniaxial drawing does not substantially change.

5. The process for producing an oriented thermoplastic polyester resin sheet according to claim 4, wherein the length of the oriented thermoplastic polyester resin sheet undergoing the uniaxial drawing and the subsequent heatset is 0.95 to 1.1 times that of the oriented thermoplastic polyester resin sheet undergoing the uniaxial drawing before the heatset.

6. The process for producing an oriented thermoplastic polyester resin sheet according to claim 3, wherein the time for the heatset is from 10 seconds to 10 minutes.

7. The process for producing an oriented thermoplastic polyester resin sheet according to claim 3, wherein the heat-setted oriented thermoplastic polyester resin sheet is annealed at a temperature from the glass transition temperature to a temperature lower than the melting point in a state that substantially no tension is applied to the sheet.

8. The process for producing an oriented thermoplastic polyester resin sheet according to claim 7, wherein the temperature at which the annealing is performed is in the range of the glass transition temperature to the rise-up temperature of the crystallization peak of the thermoplastic polyester resin in the differential scanning calorie curve measured at a temperature-raising rate of 10° C./min.

9. The process for producing an oriented thermoplastic polyester resin sheet according to claim 8, wherein the time for the annealing is 10 seconds or more.

* * * * *